United States Patent Office 3,464,118
Patented Sept. 2, 1969

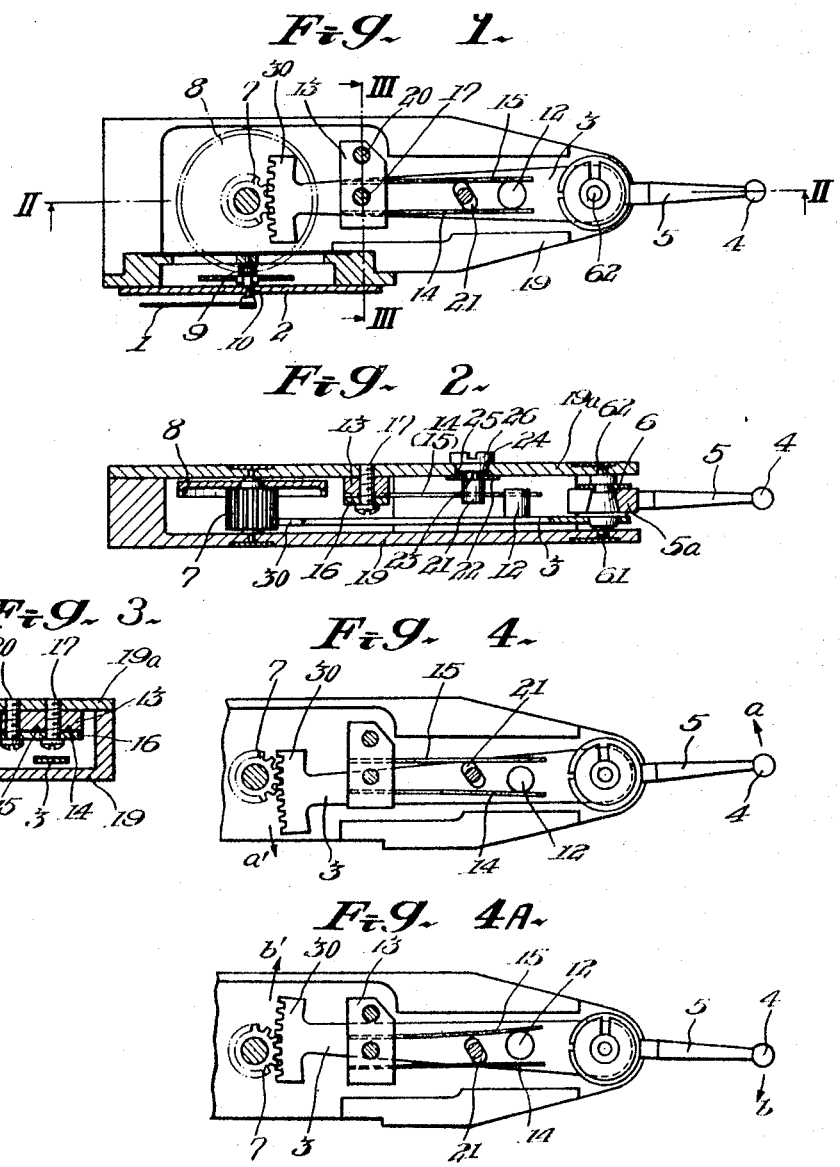

3,464,118
DIAL GAUGE AND THE LIKE
MEASURING INSTRUMENT
Kaneo Nagata, 5–6 1-chome, Saginomiya,
Nakano-ku, Tokyo, Japan
Filed May 5, 1967, Ser. No. 636,504
Claims priority, application Japan, July 29, 1966,
41/49,378
Int. Cl. G01b 3/22
U.S. Cl. 33—172                             3 Claims

ABSTRACT OF THE DISCLOSURE

An improved dial gauge including a pivotally mounted feeler lever is operable with the same values of measuring pressure in both plus and minus ranges of indication. The gauge utilizes a pair of identical spring wires, a cylindrical pin laterally movable to deflect either one of the spring wires to provide a measuring pressure, and constraining means in the form of an elliptical projection for holding one spring wire in its normal position while allowing the other spring wire to be deflected.

---

The present invention relates to dial gauges and the like measuring instruments of the type including a feeler lever operable under a measuring force in both plus and minus directions of measurement from the point where the measuring pressure is zero without necessitating any manual changeover operation and an indicator section operable in either direction to indicate the measured value.

In the past, dial gauges of the lever type have been known with which measurement can be performed irrespective of whether the feeler lever is moved in the normal or reverse direction. This type of dial gauge has ordinarily included; (I) a changeover lever for selecting the normal or reverse direction of measurement; (II) a fork member arranged to transmit the movement of the feeler lever through either one or the other arm of the fork member to the sector gear meshing with the indicator pinion; or (III) two lever arms and spiral cam means cooperable for transmission of the feeler movement to the indicator needle. Such dial gauges, however, have all been deficient as will be explained below.

Arrangement (I) makes the gauge construction complicated owing to the provision of the changeover lever; and with arrangement (II) it is difficult to obtain measuring pressure of values equal to each other in the opposite directions of measurement because of the difference in length between the two fork arms. Arrangement (III) involves sliding friction between the two levers which prevents the feeler movement from being transmitted to the spiral cam with smoothness, disadvantageously detracting from the measuring accuracy of the gauge employing such arrangement.

The principal object of the present invention is to provide a dial gauge or the like measuring instrument which is free from the deficiencies described above, being capable of providing the same measuring pressure values in the plus and minus directions of measurement and high in measuring accuracy.

Another object of the invention is to provide a dial gauge or the like measuring instrument of the character described which employs a pair of two straight wire springs and a cylindrical member engageable therewith to enable the feeler element of the gauge to operate with the same measuring, pressure values and under the same conditions in the plus and minus directions of measurement.

A further object of the invention is to provide a dial gauge or the like measuring instrument of the character described in which the transmission between the feeler element and the indicator means includes only one pivotal connection and is operable with a minimum of sliding friction.

Another object of the invention is to provide a dial gauge or the like meausring instrument of the character described which has a simplified structure which can suitably be manufactured on a mass production basis.

These and other objects, features and advantages of the present invention will become apparent from the following description when taken in conjunction with the accompanying drawings, in which:

FIG. 1 is a plan view, partly in cross section, of one preferred embodiment of the invention;

FIG. 2 is a longitudinal cross section of the dial gauge taken along the line II—II in FIG. 1;

FIG. 3 is a transverse cross section of the dial gauge taken along the line III—III in FIG. 1;

FIG. 4 is a fragmentary plan views showing different structural parts in the position assumed when the feeler rod is operated under a measuring pressure acting in one direction $a$;

FIG. 4a is a view similar to FIG. 4 but showing the parts in the position assumed when the feeler rod is operated under a measuring pressure in the opposite direction $b$;

Figure 5:
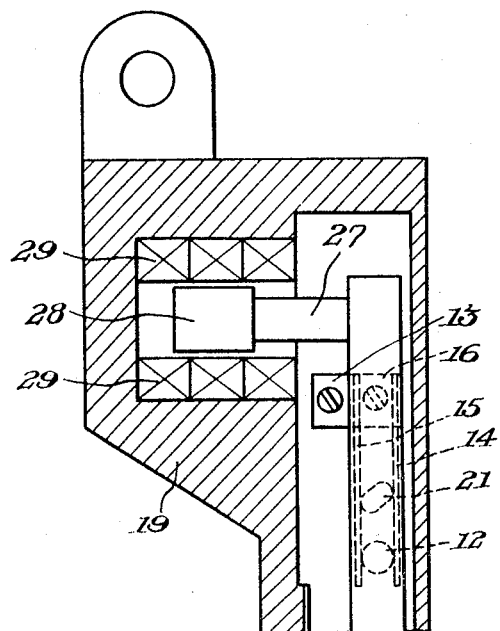
FIG. 5 is a longitudinal cross section of an electric micrometer of the type having a measuring lever which embodies the principles of the invention.

Referring first to FIGS. 1 and 2, the dial gauge shown therein includes a feeler rod 5 having an integral spherical tip 4 and a mounting boss 5a at the other end. The dial gauge has a frame including two spaced parallel plates 19 and 19a, in which a pivot shaft 6 is journaled at its respective ends and on which shaft the boss 5a of the feeler rod is fitted in secure frictional engagement therewith. Also secured to the pivot shaft 6 is a sector gear member 30 meshing with a pinion 7 which is mounted between the frame plates 19 and 19a. A cylindrical pin member 12 is firmly secured to the arm portion 3 of the sector gear member 30.

A mounting block 13 is secured to the inside of the frame plate 19a by screw studs 17 and 20 and is formed with longitudinal recesses, V-shaped in cross section, to receive two respective wire springs 14 and 15 at their one end. A clamp plate 16 is secured to the mounting block 13 by screws 17 and 20 to hold the wire springs in place on the block. The two wire springs, thus held, extend longitudinally of the frame and normally are in resilient engagement with the cylindrical surface of the pin member 12 at their respective free ends, as shown in FIG. 1.

A controlling element is carried on the frame plate 19a, which is in the form of a projection 21 having an approximately elliptical cross section and extending between the wire springs 14 and 15. The projection 21 is mounted on the plate 19a so as to be adjustable in angular position and it serves the function of causing either one of the two wire springs to be disengaged from the cylindrical pin member 12, as will be described hereinafter in more detail. As shown, the projection 21 has an adjusting head 26 at its axially outward end and includes a conical portion 25 formed adjacent to the head to fit in a corresponding conical recess formed in the frame plate 19a. A split washer 22 is mounted on the projection 21 in contact with the inside surface of the plate 19a to secure the projection 21 in its adjusted angular position.

Coaxially secured to the pinion 7 is a crown gear 8, which is in mesh with another pinion 9. This pinion 9 is fixedly mounted on a shaft 10, which carries a pointer 1 cooperable with a scale on a dial plate 2, which is secured to the gauge frame, as shown in FIG. 1.

In use of the dial gauge constructed as described above, initially the projection 21 of approximately elliptical cross section is angularly adjusted by turning its head 26 so that both the wire springs 14 and 15 are normally held in contact with the cylindrical pin member 12 on the sector gear arm 3 as well as with the peripheral surface of the projection 21, as shown in FIG. 1.

In practice, the setting of projection 21 should preferably be made so that the initial pressure under which each of the spring wires is placed in engagement with the peripheral surface of pin member 12 has an appropriate value ranging between approximately 10 and 20 grams.

In actual measurement, when the feeler rod 5 is brought into engagement with the object to be measured and swung about the axis of pivot 6 as the spherical tip 4 of the rod 5 is displaced in the direction indicated by the arrow $a$ in FIG. 4, the sector gear member 30 is swung in the direction of the arrow $a'$ by pivot 6 rotating with feeler rod 5 and drives the pointer 1 through the gear train 7-8-9. At the same time, the cylindrical pin member 12 being carried by the arm portion 3 of sector gear 30 is displaced to deflect spring wire 14 laterally against its resilience, by which a measuring pressure is afforded to the spherical end 4 of the feeler rod 5. It is to be noted that on this occasion the cylindrical pin member 12 loses its contact with the other spring wire 15, which remains in contact with the peripheral surface of the approximately elliptical projection 21, which is stationary on the frame plate 19a.

Referring next to FIG. 4a, when the end 4 of the feeler rod 5 is displaced in the opposite direction, as indicated by the arrow $b$, the sector gear 30 is swung in the direction of the arrow $b'$ to drive the pointer 1 in the opposite direction to indicate the measured value on the dial scale. In this case, it will be noted that the cylindrical pin 12 being carried by the arm portion 3 of the sector gear 30 acts to deflect spring wire 15 against its resilience, thereby affording a measuring pressure to the end 4 of feeler rod 5. Also, in this case, the spring wire 14 loses its contact with the cylindrical pin 12, remaining in contact with the approximately elliptical projection 21.

In either case, the value of measuring pressure resiliently afforded to the feeler end 4 naturally depends upon the amount of its displacement but is independent of the direction in which the feeler tip 4 is moved since the two spring wires 14 and 15 are identical having the same size and resilience.

The transmission gearing including sector gear 3-30 is thus, driven in the same manner in either direction, enabling the pointer to cooperate with the dial scale symmetrically on both its plus and minus sides.

The embodiment shown in FIGS. 1, 2 and 3 can be modified, for example, by fixing the cylindrical pin member 12 on the frame plate 19a instead of carrying it on the sector gear arm 3 and arranging the approximately elliptic projection 21 and spring wires 14, 15 on the gear arm side.

FIG. 5 illustrates an electric micrometer embodying the present invention, employing the same reference numerals for similar parts which have the same functions. Feeler lever 5 having spherical tip 4 is pivotally supported by the frame 19 of the micrometer at a fixed point 6 and carries cylindrical pin member 12 as shown in the dial gauge in FIGS. 1, 2 and 3. Spring wires 14 and 15 are mounted on the frame 19 by means of a bracket 13 secured thereto to extend past the opposite sides of the cylindrical pin 12 and an adjustor cam or projection 21 of approximately elliptical cross section is also mounted on the frame 21 so as to normally maintain a resilient contact between the wires 14 and 15 and the pin 12 and projection 21. Thus, a measuring pressure is resiliently obtained on the feeler lever 5 at its spherical tip 4 in the same manner as in the embodiment of FIGS. 1, 2 and 3.

Reference numeral 29 indicates a solenoid coil connected to an electric voltmeter (not shown) and within which coil is movable an armature or plunger 28, which is carried by a link 27 secured to another end of the feeler lever 5.

In operation, pivotal movement of the feeler lever 5 is transmitted to the plunger 28 to provide a stroke thereto of a length corresponding to the displacement of the lever end 4 thereby to produce an indication in an appropriate manner known with conventional electric micrometers.

Figure 6A:
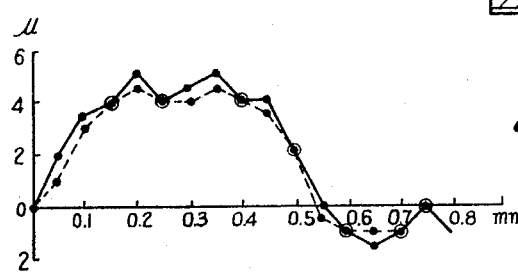
FIGS. 6a and 6b are graphical representations of the results of two testings conducted with the dial gauge shown in FIGS. 1 and 2 to demonstrate the measuring accuracy of the actual product.
Figure 6B:
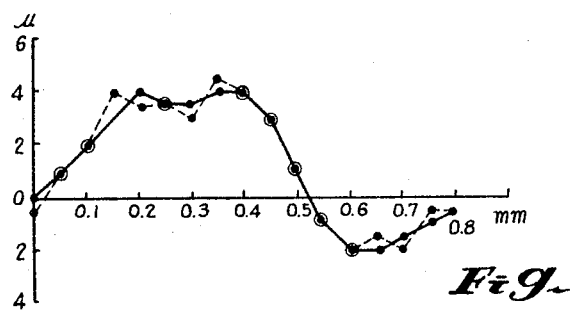

FIGS. 6a and 6b graphically represent the measuring accuracy of the dial gauge of FIGS. 1–3 by testing actual products and show that in tests Nos. 1 and 2 (below) a satisfactory return error was obtained.

|  | Test No. 1 | Test No. 2 |
|---|---|---|
| Advancing accuracy | +5 −1.5, 6.5μ | +4 −2, 6μ |
| Returning accuracy | 1μ | 1μ |

It is to be understood that the invention is not restricted to the details set forth but may be varied in many ways.

What is claimed is:

1. A measuring instrument comprising a feeler lever supported for pivotable movement about an axis and engageable with the object to be measured, an indicator coupled with said feeler lever for indicating values in accordance with the degree of pivotal movement of the feeler lever, a cylindrical member secured to and movable with the feeler lever about the pivotal axis of the feeler lever, two spring wires fixed at respective ends and extending therefrom in the same direction to normally engage said cylindrical member at the other free ends thereof, constraining means in the form of a projection of approximately elliptical cross section to constrain one of said spring wires during pivotal movement of the feeler lever while allowing the other spring wire to be deflected by said movable cylindrical member to provide a measuring pressure for the feeler lever, means for angularly adjusting the position of said projection, and coupling means for transmitting the relative displacement between said cylindrical member and said constraining means to said indicator.

2. A measuring instrument as claimed in claim 1, comprising an arm portion secured for pivotal movement with the feeler lever, said cylindrical member being mounted on said arm portion, said coupling means comprising a sector gear on said arm portion and a pinion integral with the indicator and in mesh with said sector gear, said projection being secured at a fixed location between said spring wires for angular adjustment.

3. A measuring instrument as claimed in claim 1 wherein said feeler lever includes an integral extension, said coupling means comprising an armature plunger secured to said extension for movement therewith and an induction coil proximate said plunger and adapted for connection with said indicator.

References Cited

UNITED STATES PATENTS

| 3,368,283 | 2/1968 | Le Vasseur | 33—148 |
| 2,308,207 | 1/1943 | Reinhard | 33—172 |

FOREIGN PATENTS 1,184,972  1/1965  Germany.

LEONARD FORMAN, Primary Examiner

R. A. FIELDS, Assistant Examiner

U.S. Cl. X.R.

116—124; 33—148